United States Patent [19]

McGuire

[11] Patent Number: 4,968,286
[45] Date of Patent: Nov. 6, 1990

[54] COMPOSITE COUPLING HAVING HUBS CONNECTABLE TO DRIVE AND DRIVEN MEMBERS

[75] Inventor: Dennis P. McGuire, Erie, Pa.

[73] Assignee: Lord Corporation, Erie, Pa.

[21] Appl. No.: 163,667

[22] Filed: Mar. 3, 1988

[51] Int. Cl.⁵ ............................ F16D 3/02; F16D 3/50
[52] U.S. Cl. ........................................ 464/51; 464/80; 464/92
[58] Field of Search .................... 416/134 A, 134 R; 464/51, 55, 56, 80, 87, 92, 93, 106

[56] References Cited

U.S. PATENT DOCUMENTS

| | | | |
|---|---|---|---|
| 1,107,315 | 8/1914 | Krebs | 464/80 |
| 1,501,187 | 7/1924 | Rayfield | 464/80 |
| 4,569,667 | 2/1986 | Hannibal et al. | 464/51 |
| 4,629,644 | 12/1986 | Matuska | 416/134 A X |

FOREIGN PATENT DOCUMENTS

| | | | |
|---|---|---|---|
| 490967 | 11/1975 | U.S.S.R. | 464/80 |
| 838145 | 6/1981 | U.S.S.R. | 464/87 |

Primary Examiner—Danial P. Stodola
Attorney, Agent, or Firm—Philip P. McCann; James W. Wright

[57] ABSTRACT

A lightweight, flexible coupling suitable for transmitting torque and accommodating axial and angular misalignment between drive and driven members. The coupling includes at least one reinforcing rim disposed between a pair of hubs having a plurality of projecting pins about which are secured filaments that are coated with a flexible matrix material. The filaments are geodesically wrapped from the hub one side of the reinforcing ring and then to the hub on the opposite side of the reinforcing ring. The driven and driven members are respectively attached to the projecting pins.

10 Claims, 2 Drawing Sheets

COMPOSITE COUPLING HAVING HUBS CONNECTABLE TO DRIVE AND DRIVEN MEMBERS

FIELD OF THE INVENTION

This invention relates to the field of couplings, and, more specifically, to a light weight composite coupling capable of carrying high torsional loads while accommodating relatively large annular and axial misalignment between adjoining shafts.

BACKGROUND OF THE INVENTION

In order to transfer energy from a turbine engine, conventional combustion engine, an electric motor or any power generating apparatus to a machine to power the machine, it is typically necessary to join the power generating apparatus to the machine with some sort of coupling means. These apparatuses typically transmit power through an angularly rotating shaft and this power output is typically referred to as torque. The power coupling means is a critical piece of equipment since its failure will typically result in the de-energization of the machine.

When a power generating apparatus having a high horsepower output (e.g. a 1,000 H.P. electric motor) is coupled to a machine having a high angular velocity shaft (e.g., a centrifugal pump), it is critical that the shafts of the devices are aligned as closely as possible. Misalignment will result in a number of problems including adverse vibration levels, premature bearing failure, structural damage, overheating, excessive noise, and high wear rate and failure rate of the coupling. Although it is theoretically possible to perfectly align the shafts of the power generating apparatus and the machine, there are practical limitations including measurement equipment, equipment location, adverse environmental factors, differential rates of thermal expansion during operation, etc. In addition, the design may require a specified amount of articulation. There are couplings in the prior art which permit slight shaft misalignment for high torque, high speed applications, however, the amount of misalignment is typically about $\frac{1}{4}°$ or less and these couplings are typically of metal construction and very heavy. The primary limitation of the metal couplings is that the materials of construction do not permit high torque and high angular velocity with large shaft misalignment, up to about 10°, across a broad temperature spectrum. Such a power coupling must act as a torque transmitting or driving means, and, it must also act as a flexure to permit elastic deformation to compensate for the misalignment.

The power coupling means is particularly crucial in rotary wing aircraft or helicopters. The power coupling means used in helicopters to transfer torque from the power shaft to the helicopter blades is typically referred to as a rotary hub. The rotary hubs of the prior art were complex, metal mechanisms. The disadvantages of these metal rotary hubs were several including weight, corrosion, fatigue, very high maintenance and cost.

One type of coupling means to supplant metal couplings is composite couplings incorporating layers of composite material. Such couplings include an outer reinforcing circular ring and a resin impregnated fiber strand continuously wrapped from a point tangent to a central bore to the outer surface of the ring and then to a corresponding point transversely spaced from the point tangent to the central bore following a geodesic path. Advantages of such couplings include the high strength load carrying characteristics along the continuous length of the filaments. For example, fiberglass has a tensile strength of about 665,000 psi along its length. The tension strength of such filaments is significantly greater than metal components. Composite couplings are disclosed in U.S. Pat. Nos. 4,629,644 and its related case U.S. Pat. No. 4,666,753, and 4,391,594 and its divisional case U.S. Pat. No. 4,569,667.

The divisional patents '594 and '667 are owned by the assignee of the present case and will be described together. In these patents, a lightweight, flexible coupling is disclosed including a reinforcing ring, a pair of hubs each having a shaft extension for connection to either a drive or driven member and resin impregnated filaments wrapped around a pin on one hub on one side of the reinforcing ring to and across the reinforcing ring and then around a pin on the other hub on the opposite side of the reinforcing ring following a geodesic path. The shaft extension of each hub extends transversely outwardly of the filament portion of the coupling to permit attachment of respective drive or driven members thereto. Such shaft extensions are disadvantageous to the coupling since they add unnecessary weight thereto. The wrapping of the filaments around the pins make production of such couplings very difficult. One method to apply the filaments is by hand wrapping. Further, the straight line or geodesic path of the filaments is substantially altered at the hubs where a filament buildup occurs. This can contribute to early fatigue of the filaments and increased cocking stiffness to the coupling.

In related patents '644 and '753, a lightweight flexible coupling is disclosed including a reinforcing ring, a pair of hub sections with bores therethrough and having attachment holes for drive or driven members therein. Resin impregnated filaments are wrapped tangentially from the bore of one hub on one side of the reinforcing ring to and across the reinforcing ring and then tangentially to the bore of the other hub section on the opposite side of the reinforcing ring. The attachment holes are drilled through the filaments thereby breaking their continuous nature and reducing the tension strength characteristics of the filaments by as much as 30%.

Metal attachment sections for composite couplings are desirous to distribute stresses and avoid the fragility of composite materials. Composite materials that are slightly damaged may be susceptible to failure. One of the requisites of incorporating metal attachments is suitable bonding and anchoring of the filaments to the metal attachment sections. Such bonding has not been shown in the described prior art.

SUMMARY OF THE INVENTION

It is an object of this invention to provide a thinner flatter flexible composite coupling having unbroken filaments therein.

It is a further object of the present invention to provide a flexible composite coupling attachable to a drive and driven member without incorporating an outwardly extending shaft and/or flange connector.

It is a feature of this invention to have a pair of spaced apart hubs each including a plurality of pin elements attachable to the respective drive or driven members. The filaments are unbrokenly continuously wrapped in a continuous geodesic path about the pin elements where the filaments are disposed on either side or both sides of the pins.

It is an advantage of this invention that the drive and driven members can be attached directly to the hub of the flexible coupling wherein a shaft extension of the hub is not required.

It is a further advantage of the present invention that all the filaments are continuous thereby providing the ultimate strength thereof.

More specifically, in the present invention a coupling for accommodating misalignment between a drive and driven member is described having a longitudinal axis. A rigid reinforcing ring encircles the longitudinal axis and a pair of spaced apart rigid hubs disposed radially inwardly of the ring. Mounted on each of the hubs are a plurality of pin elements projecting parallel to the longitudinal axis and outwardly therefrom. Each of the pin elements has a threaded bore to which the drive or driven members may be attached. A plurality of resin impregnated filaments are wrapped in a plurality of wrapping circuits following a geodesic path to form a connecting means between the hubs. The filaments are wrapped between the pins wherein the filaments are disposed on either side or both sides of the pins and the filament extends to and across the rigid reinforcing ring and then to another pin element of the pair. Upon completion of assembly the resin material is cured bonding the components together. The coupling may further include a pair of annular rigid plates each having a plurality of circumferentially spaced holes. Each plate is affixed upon one of the hubs wherein the pin elements extend through the circumferentially spaced holes. The rigid plates are affixed to the hub prior to curing and upon curing become bonded to the assembly.

DETAILED DESCRIPTION OF THE INVENTION

Figure 1:
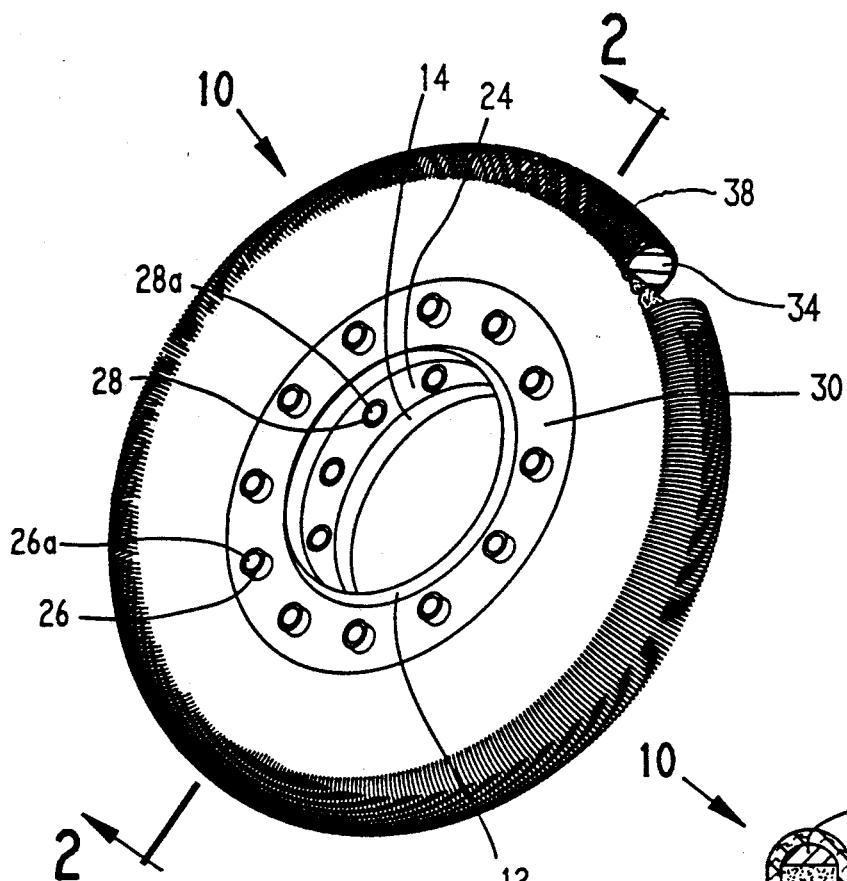
FIG. 1 is an isometric view of one embodiment of the composite coupling of the present invention having a cutaway section showing the reinforcing ring.
Figure 2:
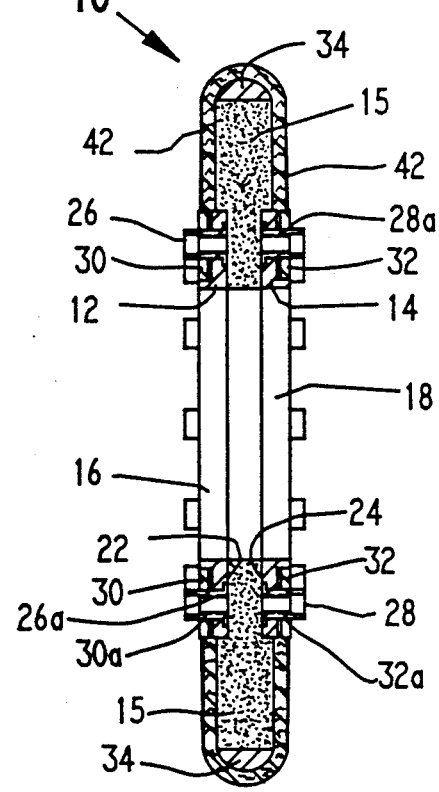
FIG. 2 is a cross-sectional view taken generally along line 2—2 of FIG. 1 showing the reinforcing ring, removable mandrel, the pair of rigid hubs and the pins.

Referring now to the drawings and in particular to FIGS. 1 and 2, an embodiment of the composite coupling of the present invention is shown and labeled generally with the reference 10. Coupling 10 includes a pair of hubs 12 and 14 which are held in spaced relation and concentric with one another by a removable mandrel 15. The hubs 12, 14 may be made of composite material but more preferably of stainless steel. Each hub 12 and 14 has a bore 16, 18 therethrough and has an inwardly facing flange 22, 24 respectively and a plurality of pins 26, 28 each having a threaded bore 26a, 28a therethrough. These pins 26, 28 are circumferentially equally spaced on the surface of the inwardly facing flanges 22, 24 at a substantially equal radius from the central bore 18, 20 of hubs 12, 14. Affixed to the pins 26, 28, outward of the inwardly facing flanges 22, 24 are flat annular rigid plates 30, 32 respectively, each having a plurality of holes 30a, 32a transversely therethrough for the pins 26, 28 to pass through. The fit between of the rigid plates 30, 32 in the respective hubs 12, 14 is preferably very tight. In another embodiment of the invention the rigid plates 30, 32 may be affixed directly to the drive and driven members and attached to the coupling 10 in the field.

A reinforcing ring 34 of larger diameter than hubs 12 and 14, is disposed radially outwardly of the hubs 12 and 14 and held in place by the outer edge of the removable mandrel 15. The reinforcing ring 34 is preferably formed of a metal such as aluminum or a graphite/epoxy composite having sufficient compressive strength and stiffness to resist the forces induced by the torque of the anticipated application for coupling 10. At this point, it should be noted that prior to the formation of coupling 10, discussed below, there is no direct connection between the hubs 12 and 14 either with each other or with the reinforcing ring 34 except through the mandrel 15 which is later removed. Relative movement of the hubs 12 and 14, and in turn the shafts to which the are connected, is thus completely dependent on the connecting means attaching thereto.

Figure 3:
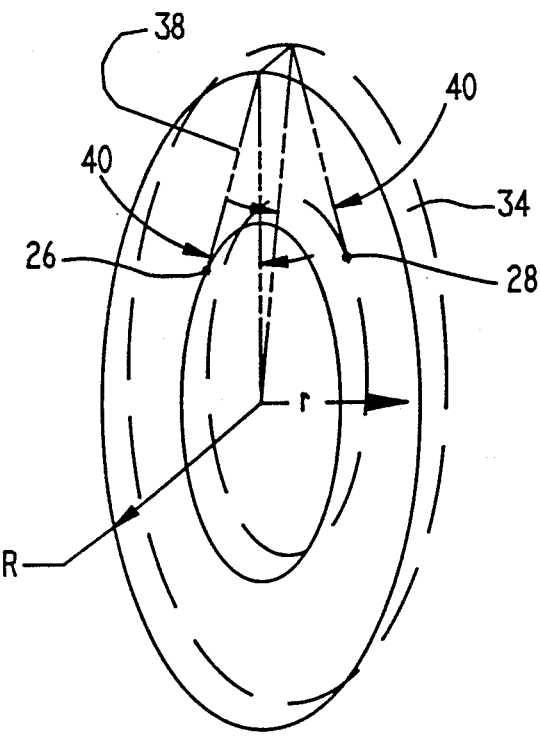
FIG. 3 is a partial isometric view of the coupling herein showing the manner of wrapping the fiber material from one side of the coupling to the other.
Figure 4:
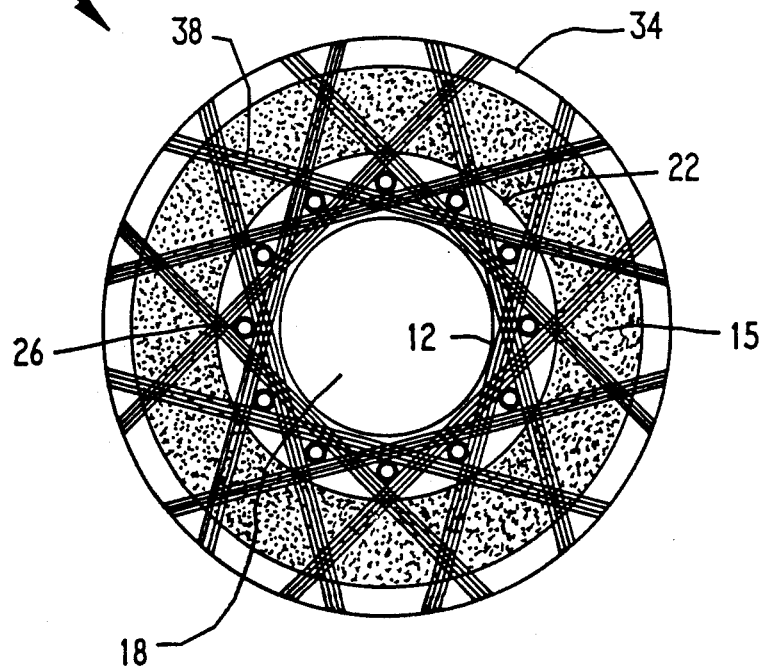
FIG. 4 is a front view of the embodiment of FIG. 1 showing the filaments disposed on either side of the pins as well as the continuous unbroken geodesic winding of the fibers.

Referring now to FIGS. 2, 3 and 4, the connecting means for forming coupling 10 is shown. A continuous length of high strength resin impregnated fiber strands or bundles such as graphite, aramid glass or a suitable equivalent known as filaments 38 is wrapped on a substantially geodesic path from one side of the pin 26 of hub 12 to and across the outer surface of the reinforcing ring 34 and then to a side of pin 28 of hub 14 on the opposite side of reinforcing ring 34 and so on. The geodesic path forms a substantially straight line from one portion of the reinforcing ring to another portion thereof. The filament being wrapped in the geodesic path has a width of about 0.16 inch and may contact a pin on either or both sides along the geodesic path. In particular, to avoid breakage of the filaments, a removal pointed projection is applied to each pin element whereby the filament is directed to one side of the pin as the filament may be split having portions on either side of the pin. This winding technique avoids breakage of the filament.

As shown in FIG. 3, chords drawn from the pin 26 to the points at which the fiber contacts the edges of reinforcing ring 34, form an angle 40 with the fiber on either side of coupling 10. The winding is continued between the same two pins 26, 28 of hubs 12, 14 until enough filaments 38 are laid down to obtain the desired torsional strength at which time the winding is transferred to a second set of two pins and so on. Anchoring of the filaments 38 to the pins 26, 28 is accomplished by affixing the rigid plate 30, 32 to the hub 12, 14 which prevent outward radial or lateral movement of the filaments 38.

The following relationship applies in wrapping the continuous fiber along the geodesic or shortest path between the pins 26, 28 of hubs 12 and 14.

$$\sin\theta = r/R$$

Where:
  r = radius of the hub shafts
  R = radius from the center of the hub shafts to the reinforcing ring The significance of wrapping the fiber along the shortest of geodesic path between the pins 26, 28 of hubs 12 and 14, is that application of a torsional force in the clockwise direction for example will be instantaneously resisted by the tensile strength and modulus of elasticity of one half of the fibers. The same torque carrying capability is provided for in counterclockwise rotation of coupling 10, wherein the other half of the fibers forming coupling 10 are placed in tension. If the fiber did not follow the geodesic path, application of torque would cause a degree of slippage or straightening of the fiber since it is not mechanically attached to the reinforcing ring 34. This would result in unwanted torsional softness in coupling 10 and undesirable stresses in the composite structure. Since the only connection between hubs 12 and 14 is the fiber, all of the torque applied by the driving shaft will be transmitted directly through the fiber to the driven shaft and sufficient torsional strength must be provided to accommodate maximum torque for a given application.

In forming the completed coupling 10, the continuous length of fiber is first impregnated with a flexible matrix such as natural rubber, epoxy, thermoplastic, thermoplastic elastomer, or polyurethane and then wrapped along the surface of mandrel 15 in a geodesic path as discussed above from hub 12 to reinforcing ring 34 and then to hub 14. For purposes of discussion, each successive wrap of the fiber will be considered as forming an individual filament 38. Once a wrapping circuit is completed, successive circuits lay down filaments 38 immediately adjacent to one another to form a partial or complete bladder or diaphragm 42 on either side of the reinforcing ring 34 which increases in thickness from the reinforcing ring 34 to the hubs 12 and 14.

Once the wrapping is completed and the rigid plates 30, 32 affixed to the respective hubs 12, 14, by a press fit and bonded by an adhesive or mechanical fastener. This configuration allows for transfer of torque to the fibers through the inner faces of both hubs 12, 14. The matrix material is then cured while the coupling 10 is still on the mandrel 15. The mandrel 15 may then be removed allowing the cured diaphragms 42 to flex freely. The coupling 10 is exceedingly light in weight and exhibits high torsional stiffness and strength in the direction of winding of filaments 28. It should be understood that the use of fourteen pins 26, 28 in coupling 10 is not critical and may be varied as desired. In one embodiment, 24 pins have been used.

The coupling of the present invention may be used to connect a drive shaft member to a driven shaft member wherein the coupling accommodates misalignment up to about 10° while transmitting the rotary motion. In particular, the drive shaft member and driven shaft members have flanges affixed to the hubs 12, 14 of the coupling 10 by screws fastened to the threaded bores 26a, 28a of the pins 26, 28.

Several improvements of the couplings herein over the prior art should be noted. The continuous fiber is unbrokenly wrapped directly from pins of one hub to and across a reinforcing ring and then adjacent to pins of the other hub along the shortest possible or geodesic path. The continuous straight-line filament path simplifies the winding operation and reduces fabrication time substantially. It also results in a much flatter and more uniform thickness diaphragm. The flatness and thickness of the diaphragm are critical factors in the misalignment capability of the coupling.

The pins of the coupling are utilized as attachment means to the drive and driven members thereby eliminating the need to drill a hole through the filaments. Elimination of such holes substantially increases the strength of the coupling. Since the hubs or plates are spaced apart, all of the torque applied to the couplings is transmitted through the fiber and resisted by the relatively high tensile strength and modulus of the fiber. Disposing of the fiber as described above assures the fiber remains in place under expected operating torque. Furthermore, the elimination of an extending shaft and flange means reduces the thickness of the coupling.

Once the wrapping procedure is completed and the mandrel removed, the cured filaments impregnated with a flexible matrix display a high degree of flexibility in the angular and axial modes. The result is a light weight coupling capable of transmitting high torque loads while retaining sufficient flexibility to accommodate relatively high degrees of angular and axial misalignment between the shafts to be joined. Furthermore, it has been found the coupling of the present invention has been determined to be operable at speeds of greater than 20,000 rpm.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A coupling having a longitudinal axis for transmitting torque and accommodating misalignment between a drive member and a driven member comprising
   a rigid ring encircling said longitudinal axis;
   a pair of rigid hubs spaced apart along said longitudinal axis and being disposed radially inwardly of and in concentric relationship with said rigid ring;
   a plurality of pin elements fixedly mounted upon and transversely projecting parallel to the longitudinal axis from each of said rigid hubs, each of said pin elements having a bore, said pin elements of one of said rigid hubs being directly physically connectable to said drive member and the pin elements of said other of said rigid hubs being directly physically connectable to said driven member;
   a filament being wrapped in a plurality of wrapping circuits in substantially straight lines around said rigid ring to form a connecting means between said hubs, said filament being wrapped in a continuous geodesic path about said pin elements, wherein the filament is disposed on either side or on both sides of said pin elements and extending to and across said rigid ring and then to said pin elements of said other hub; and
   a matrix material impregnating said filament;
   whereby torque applied to said coupling is transmitted from said one of said hubs through said connecting means to said other of said hubs.

2. A coupling as in claim 1 wherein said pin elements include a bore to allow attachment of one of said hubs to said drive member and attachment of said other of said hubs to said driven member.

3. A coupling as in claim 2 wherein said bores are threaded.

4. A coupling as in claim 1 further comprising a pair of rigid plate members having a plurality of holes therethrough allowing for each rigid plate member to be mated and bonded with a hub and pin elements thereon wherein said pin elements extend through said holes of the rigid plate member to prevent displacement therefrom of filaments wrapped thereabout.

5. A coupling having a longitudinal axis for transmitting torque and accommodating misalignment between a drive member and a driven member comprising
  a rigid reinforcing ring encircling said longitudinal axis;
  a pair of rigid hubs spaced apart along said longitudinal axis and being disposed radially inwardly of and in concentric relationship with said rigid reinforcing ring, each of said hubs having a bore therethrough;
  a plurality of pin elements fixedly mounted upon and projecting parallel to said longitudinal axis from each of said hubs, each of said pin elements having a threaded bore, said pin elements of one of said hubs being directly physically connected to said drive member and the pin elements of said other of said hubs being directly physically connected to said driven member;
  a filament impregnated with a matrix material, said filament being continuously wrapped in a plurality of wrapping circuits in substantially straight lines around said rigid ring to form a connecting means between said hubs, said filament being wrapped in a continuous unbroken geodesic path about said pin elements, wherein the filament is disposed on either side or on both sides of said pin elements said filaments extending to and across said reinforcing ring and then being disposed about said pin elements of said other hub; and
  a pair of annular rigid plate members having a plurality of holes extending transversely therethrough, one rigid plate member affixed upon of said hubs having said pin elements extend at least into said holes of said one rigid plate member, the other rigid plate member affixed upon said other of said hubs having said pin elements extend at least into said holes of said other rigid plate member, said rigid plate members affixed to said hubs in the transverse outward position;
  whereby torque applied to said coupling is transmitted from said one of said hubs through said connecting means to said other of said hubs.

6. A coupling as in claim 5 wherein said matrix material is polyurethane.

7. A coupling as in claim 5 having a plurality of pin elements equally circumferentially spaced on said hubs and equally radially spaced from said bores of said hubs.

8. A coupling having a longitudinal axis for transmitting torque and accommodating misalignment between a drive member and a driven member comprising
  a rigid reinforcing ring encircling said longitudinal axis;
  a pair of rigid hubs spaced apart along said longitudinal axis and being disposed radially inwardly of and in concentric relationship with said rigid reinforcing ring;
  a plurality of rigid pin elements fixedly mounted upon and extending parallel to said longitudinal axis through and from each of said metal hubs, each of said pin elements having a bore therethrough at least partially threaded, said pin elements of one of said metal hubs being directly physically connectable to said drive member and the pin elements of said other of said metal hubs being directly physically connectable to said driven member;
  a filament impregnated with a matrix material, said filament being continuously wrapped in a plurality of wrapping circuits in substantially straight lines around said rigid ring to form connecting means between said metal hubs, said filament being geodesically wrapped in a between pin elements of said pair of hubs, said filament being disposed about said one pin element and extending to and across said reinforcing ring and then being disposed about said other pin element of said other hub;
  a pair of annular rigid plates having a plurality of holes extending transversely therethrough, one annular rigid plate member affixed upon one of said hubs having said pin elements extend through said holes therein and the other annular rigid plate member affixed upon said other of said hubs having said pin elements extend through said holes therein, said annular rigid plate affixed to said hubs in the transverse outward position of each hub;
  whereby torque applied to said coupling is transmitted from said one of said hubs through said connecting means to said other of said hubs.

9. A coupling as in claim 8 wherein said metal is stainless steel.

10. A coupling as in claim 8 wherein said matrix material is polyurethane.

* * * * *